United States Patent [19]
Baessler et al.

[11] 3,736,363
[45] May 29, 1973

[54] PHYSIOLOGIC FUNCTION SIMULATOR

[75] Inventors: Lee R. Baessler, Manhattan Beach; Adelbert W. Valiensi, Los Angeles; Harvey F. Glassner, Carson, all of Calif.

[73] Assignee: Humetrics Corporation, Los Angeles, Calif.

[22] Filed: Nov. 9, 1971

[21] Appl. No.: 196,997

[52] U.S. Cl. .......................... 35/17, 178/18, 328/187
[51] Int. Cl. .............................................. G09b 23/28
[58] Field of Search .......................... 35/17; 178/18; 328/187

[56] References Cited
UNITED STATES PATENTS

| 3,567,859 | 3/1971 | Ellis | 178/18 |
| 3,652,999 | 3/1972 | Hjort | 340/172.5 |
| 3,662,076 | 5/1972 | Gordon | 35/17 |

*Primary Examiner*—Harland S. Skogquist
*Attorney*—L. Lawton Rogers, III

[57] ABSTRACT

A method and apparatus for selectively and repetitively providing an analog electrical signal. The desired waveform may be drawn on a pen/digital device and the digital Y coordinate signal stored. The storage may thereafter be cyclically addressed by the X coordinate signal for repetitive reproduction of the waveform.

7 Claims, 3 Drawing Figures

INVENTORS
LEE R. BAESSLER
ADELBERT W. VALIENSI
HARVEY F. GLASSNER

BY Burns, Doane, Swecker & Mathis
ATTORNEYS

PHYSIOLOGIC FUNCTION SIMULATOR

BACKGROUND OF THE INVENTION

The present invention relates to the method and apparatus for reproducing waveforms and more particularly to a method and apparatus particularly adapted for the production of physiologic waveforms for the instruction of medical and paramedical personnel.

A widely used technique in the instruction of medical and paramedical personnel is the utilization of actual patients in teaching hospitals or research institutions. This bedside technique permits only a small group of students and is thus severely limiting in the ratio of physicians to students. This technique is further severely limited both by the availability of patients exhibiting the symptoms and other characteristics, the recognition of which is desired to be taught.

By way of example, in instruction in the evaluation of the low frequency physiologic data obtained through the palpation of a patient's chest, it is desirable to illustrate the differences in various clinical conditions in regard to the shape, rise times, rates of decline, and maintained elevations or depressions of the waves as well as the sequence of impulses, etc. Further, it is desirable that these differences by displayed to the students both visually on an oscilloscope and tactually by the use of apparatus such as that disclosed in the pending Baessler et al. U. S. patent application "Palpation Method and Apparatus" Ser. No. 177,860, filed Sept. 3, 1971, and assigned to the assignee of the present invention.

In an attempt to solve these instruction problems, i.e., physician/student ratio and patient availability, magnetic tapes or other permanent records have been prepared for classroom reproduction of the waveforms. Such methods are, however, largely inflexible in that a predetermined teaching pattern must be followed. Moreover, the instructor generally cannot in such systems vary the basic parameters, accentuate points, and provide additional examples, or minor derivations, for instruction in response to student questions.

It is accordingly an object of the present invention to obviate the above and other deficiencies of the known techniques and to provide a novel method and apparatus for producing waveforms of selected shapes.

Through the utilization of the present invention, selected functions may be manufactured, altered, displayed, recorded and utilized to activate other devices.

It is thus another object of the present invention to provide a novel method and apparatus by which a waveform may be drawn for immediate conversion to its electrical analog.

As earlier indicated, the present invention is particularly adapted for producing physiologic waveforms for instructional purposes. Examples of such physiologic functions are the electrocardiogram, the blood pressure wave, the ballistocardiogram, electroencephalogram and heart sound signals. It is therefore another object of the present invention to provide a novel method and apparatus for the instruction of medical and paramedical personnel.

These and other objects and advantages of the present invention will be readily apparent from the claims and from the following detailed description of a preferred embodiment when read in conjunction with the appended drawings.

THE DRAWINGS

THE DETAILED DESCRIPTION

Figure 1:
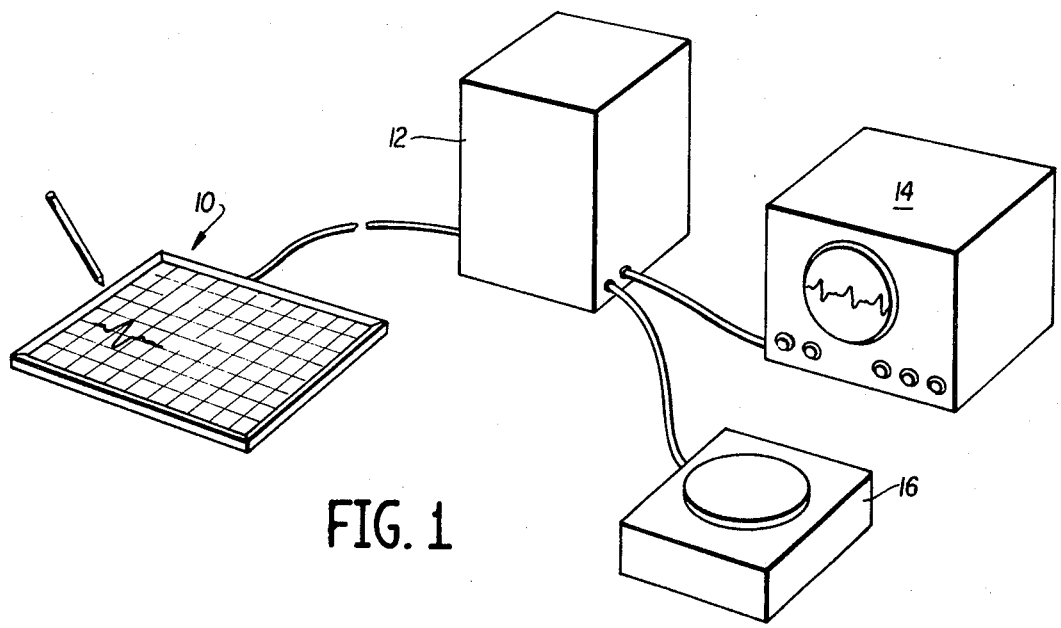
FIG. 1 illustrates the system of the present invention.

With reference to FIG. 1, an input device 10 is illustrated as a conventional pen/digital input device such as a data tablet commercially obtainable from Science Accessory Corporation of 65 Station Street, Southport, Conn. 06490. Alternatively, the pen/digital input device 10 may be any suitable conventional device fabricated with translatory potentiometers and analog to digital converters designed to produce a binary representation of the X and Y coordinates corresponding to the location of a styllus on the tablet surface as the styllus is moved across the surface in tracing the waveform desired to be reproduced.

Figure 2:
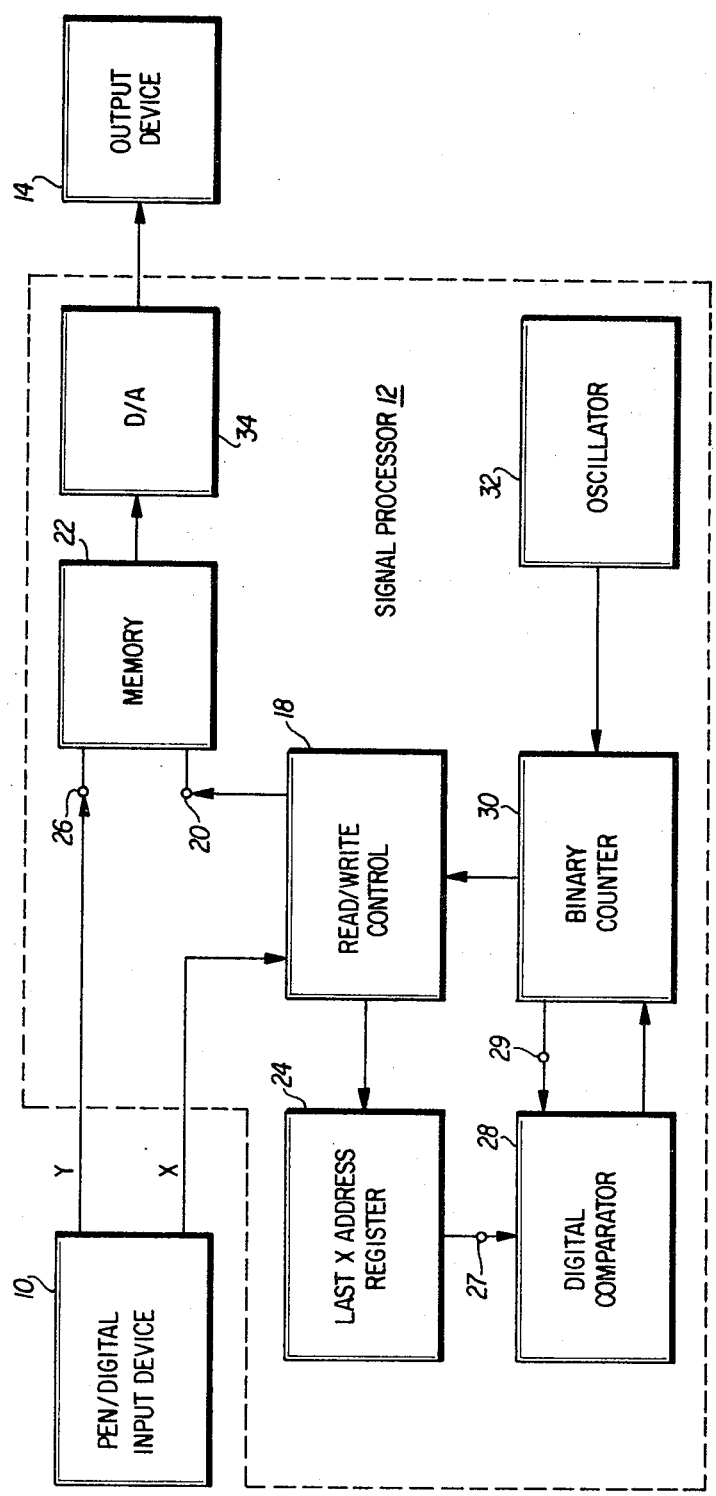
FIG. 2 is a functional block diagram of the system of FIG. 1.

The X and Y coordinate representing digital output signals X and Y respectively from the pen/digital input device 10 are applied to the signal processor 12 illustrated in greater detail in FIG. 2. As will be subsequently explained in greater detail, the signal processor 12 utilized the digital X and Y coordinate representing signals X and Y to produce an analog waveform for application to a suitable output device such as a conventional oscilloscope 14 or a palpation platform 16 such as that described and claimed in the aforementioned Baessler et al U. S. Application Ser. No. 177,860 assigned to the assignee of the present invention.

It is to be understood that the number and type of the output devices can widely vary. For example, a single physician may sketch a particular waveform on a data tablet at the lectern to thereby provide a repetitive electrical analog signal input to a master palpation platform at the lectern and simultaneously to a large number of individual palpation platforms located one at each studen's desk. Enormous flexibility in illustrating a lecture is thus provided.

With reference now to the more detailed block diagram of FIG. 2, the digital X coordinate representing signal X may be applied from the pen/digital input device 10 to a read/write control circuit 18. With the read/write control circuit 18 in the "write" mode, this X coordinate representing digital number may be applied in parallel through the control circuit 18 to the address input terminals of a memory circuit 22 collectively indicated at 20. This X coordinate representing digital number may, in addition, be applied to a last X address register 24. The last X address register 24 is operative to store the digital number corresponding to the last X coordinate location of the pen or styllus of the pen/digital input device 10 at the time that the read/write control circuit 18 is taken out of the "write" mode. The digital output signal from the pen/digital input device 10 representing the Y coordinate of the pen on the tablet surface thereof may be applied in parallel directly to the data input terminals 26 of the memory circuit 22.

The digital address signal stored in the last X address register 24 may be applied to one input terminal 27 of a suitable conventional digital comparator 28 which also receives, by way of a second input terminal 29, the digital output signal from a suitable conventional plural stage binary counter 30. The binary counter 30 may in turn be driven by a suitable conventional oscillator 32 having a stable output frequency, e.g. a crystal controlled oscillator. The digital comparator 28 also applies a reset signal to the reset input terminal R of the binary counter 30. The output signal from the binary counter 30 representing the count therein as cycled by the signal from the oscillator 32 is also applied to the read/write control circuit 18 for application to the collective address input terminal 20 of the memory circuit 22. The output signal from the memory circuit 22 is applied by way of a suitable conventional digital analog converter 34 and a suitable conventional low pass filter 35 to one or more of the output devices described in connection with FIG. 1.

Figure 3:
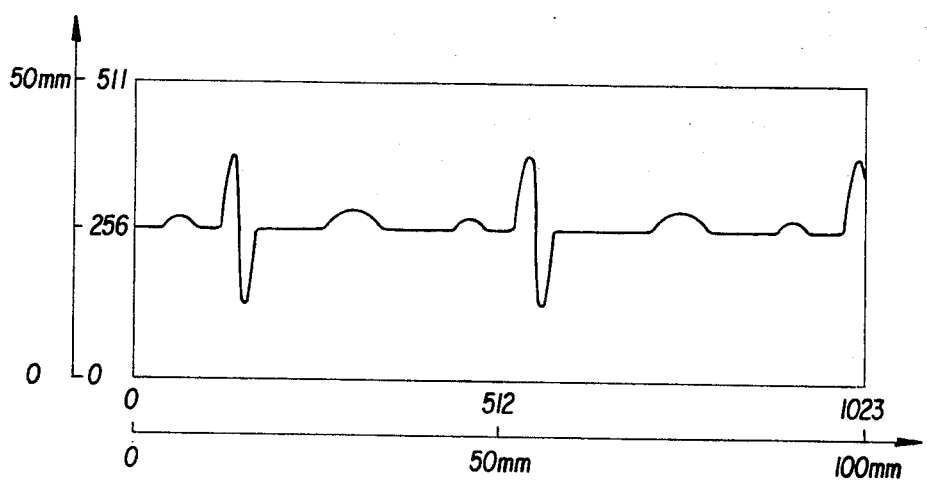
FIG. 3 is a representation of the trace of the input device.

In operation and with reference to FIGS. 2 and 3, the digital signal X representing the abscissa or X coordinate is selected as the address or memory location and the digital signal Y representing the ordinate or Y coordinate is chosen as the data word. Thus any waveform which can be drawn, for example, on a data tablet surface divided equally into 1024 equal parts on the abscissa and 512 equal parts on the ordinate can be stored in a nine-bit per word memory. Thus any waveform which cab be drawn on the tablet surface of such a pen/digital input device 10 can be completely described by a set of 1024 number pairs. Sequencing through the word locations from 0 through 1023 at the proper rate provides a digitized version of the waveform drawn on the pen/digital input device 10 at the output terminals of the memory circuit 22. The digital to analog converter 34 is then used to reconstruct the digitized waveform to a time varying signal whereby the traced waveform can be repeatedly generated for display and/or other utilization.

In the "write" mode of the read/write control circuit 18, the X coordinate representing signal X from the pen/digital input device 10 may be applied to the last X address register 24 at the same time that the Y coordinate representing signals are applied to the data input terminal 26 of the memory circuit 22 for storage therein. In the example disclosed, it has been found convenient for the oscillator 32 to provide an output signal to the binary counter 30 at a frequency of 256 hertz. The oscillator may, of course, generate a much higher frequency waveform for subsequent reduction by any suitable conventional scaler (not shown).

As the binary counter 30 is successively triggered or cycled by the signal from the oscillator 32, the output signal from the counter 30 is compared in the digital comparator 28 with the last X coordinate representing address signal stored in the register 24. When the count contained in the binary counter 30 equals the last X coordinate, the digital comparator 28 operates to reset the binary counter thereby limiting the cycling of the binary counter to the portion of the tablet on which an input waveform has been sketched by the pen. The operator of the pen/digital input device 10 may thus stop tracing at any place along the X coordinate or time axis of the data tablet.

With the read/write control circuit 18 placed in the "read" mode, the binary counter 30 continues to cycle from 0 to the last address value, i.e., the last X coordinate representing signal X stored in the register 24. In the "read" mode, the output signal from the binary counter is applied through the read/write control circuit 18 to the address input terminal of the memory circuit 22 to thereby cycle the Y coordinate digital signals of the traced waveform out of the memory circuit 22 to the digital to analog convertor 34 for conversion to a time varying signal. Inasmuch as the binary counter 30 is continually recycling under control of the oscillator 32, a waveform traced over the initial one-fourth of the X coordinate surface of the pen/digital input device 10 will be reproduced as an electrical analog signal four times consecutively in the time framework of the tablet surface of the pen/digital input device 10.

ADVANTAGES AND SCOPE OF THE INVENTION

While described above as a physiologic function generator, the method and apparatus of the present invention has great utility in any environment wherein the selective and repetitive generation of an analog signal is desired. A heretofore unachieved flexibility, particularly in an instructional environment, is thus present as the waveform may be selectively altered in any respect. In such an environment, the ratio of instructors to students may be significantly reduced while at the same time the quality of the instruction greatly increased.

The present invention may thus be embodied in other specific forms without departing from the spirit or essential characteristic thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A physiologic signal generator comprising:
   a substantially planar surface;
   means responsive to the movement of a manually positionable pen across said surface for providing a digital position signal related to the position of the pen relative to a first and second axis in the plane of said surface, said first and second axis being substantially normal to each other;
   means for storing the portion of said digital position signal related to the position of the pen relative to the first axis of said surface at an address related to the position of the pen relative to the second axis of said surface;
   means for storing a digital control signal related to the last address at which a portion of said digital position signal is stored in said storage means;
   means for repetitively addressing only the portion of said storage means in which a pen position signal is stored at a predetermined rate to provide a repetitive digital output signal related to the position of the pen relative to the first axis of said surface; and,
   means for converting said digital output signal to analog form.

2. The physiologic signal generator of claim 1 wherein said repetitive addressing means includes:
   an oscillator having a predetermined pulse repetition rate;
   a binary counter responsive to said oscillator;
   means for storing a signal related to the address of the portion of said digital signal last stored in said position signal storage means; and,
   a digital comparator for comparing said stored address signal with the count in said binary counter and for providing a signal for resetting said binary counter responsively to the comparison.

3. The physiologic signal generator of claim 2 including a low pass filter operatively connected to receive said output signal after conversion to analog form.

4. The physiologic signal generator of claim 1 including palpation platform means, and means for applying said analog output signal to said palpation platform means whereby said physiologic signal may be tactually monitored.

5. The physiologic signal generator of claim 1 including cathode ray tube means, and means for applying said physiologic signal to said cathode ray tube means whereby said physiologic signal may be visually displayed.

6. A method of providing a repetitive signal comprising the steps of:
 a. manually moving a pen across a substantially planar surface to thereby generate a digital signal related to the position of the pen relative to the surface;
 b. storing the generated digital signal;
 c. generating a periodic pulsating signal;
 d. counting the pulses in the periodic signal;
 e. storing the address of the last stored digital signal;
 f. comparing the number of pulses counted with the stored address;
 g. reinitiating the reading of the stored digital signal responsively to the comparison; and,
 h. converting the output signal to analog form.

7. The method of claim 6 wherein the signal generated is physiologic; and,
 wherein the analog output signal is both visually and physically displayed.

* * * * *